United States Patent [19]

Boll et al.

[11] Patent Number: 5,046,550
[45] Date of Patent: Sep. 10, 1991

[54] COOLING-AIR DUCTING SYSTEM IN THE FRONT-END SPACE OF A MOTOR VEHICLE

[75] Inventors: Wolf Boll, Weinstadt; Reinhard Steinkämper, Winnenden, both of Fed. Rep. of Germany

[73] Assignee: Mercedes-Benz AG, Fed. Rep. of Germany

[21] Appl. No.: 580,598

[22] Filed: Sep. 11, 1990

[30] Foreign Application Priority Data

Sep. 9, 1989 [DE] Fed. Rep. of Germany ....... 3930076

[51] Int. Cl.[5] ...................... B60K 11/02; B60K 11/04; F01P 3/18
[52] U.S. Cl. ......................................... 165/41; 165/51; 165/140; 165/44; 123/41.49; 123/41.31; 123/41.33; 123/563; 180/68.1; 180/68.4
[58] Field of Search ...................... 165/41, 44, 51, 140, 165/148, 149; 123/41.48, 41.49, 41.51, 563, 41.31, 41.33; 180/68.1, 68.4

[56] References Cited

U.S. PATENT DOCUMENTS

| | | |
|---|---|---|
| 1,621,918 | 3/1927 | Zimmerman et al. . |
| 1,818,144 | 8/1931 | MacLeod . |
| 3,163,995 | 1/1965 | Maier . |
| 3,653,431 | 4/1972 | Loveley . |
| 3,906,740 | 9/1975 | Thomas . |
| 3,933,136 | 1/1976 | Burst ..................... 165/51 |
| 4,034,804 | 7/1977 | Meier et al. . |
| 4,324,286 | 4/1982 | Butt . |
| 4,356,965 | 11/1982 | Matsushima et al. . |
| 4,440,212 | 4/1984 | Tanino et al. . |
| 4,469,167 | 9/1984 | Itoh et al. . |
| 4,470,455 | 9/1984 | Sacca . |
| 4,566,407 | 1/1986 | Peter ..................... 165/51 |
| 4,651,816 | 3/1987 | Struss et al. ............ 165/140 |
| 4,660,624 | 4/1987 | Yamaguchi . |
| 4,691,767 | 9/1987 | Tanaka et al. . |
| 4,696,342 | 9/1987 | Yamauchi et al. . |
| 4,715,437 | 12/1987 | Tanaka et al. . |
| 4,723,594 | 2/1988 | Kaehr et al. . |
| 4,909,311 | 3/1990 | Nakamura et al. ......... 165/41 |
| 4,938,303 | 7/1990 | Schaal et al. ............ 180/68.1 |

FOREIGN PATENT DOCUMENTS

| | | |
|---|---|---|
| 3236949 | 4/1984 | Fed. Rep. of Germany ..... 180/68.1 |
| 3338466 | 1/1987 | Fed. Rep. of Germany . |
| 3611713 | 5/1987 | Fed. Rep. of Germany . |
| 3804365 | 3/1989 | Fed. Rep. of Germany . |
| 237893 | 11/1925 | United Kingdom ............ 165/41 |
| 2174652 | 11/1986 | United Kingdom ............ 180/68.4 |

Primary Examiner—John K. Ford
Attorney, Agent, or Firm—Evenson, Wands, Edwards, Lenahan & McKeown

[57] ABSTRACT

A cooling-air ducting system in the front-end space of a motor vehicle is described, which front-end space is delimited by a front-end wall having an air inlet opening and in which front-end space is arranged a cooler through which cooling air flows, having a cooling-air ducting space between front-end wall and cooler and a cooling-air fan downstream of the cooler. In order to achieve a sufficient cooler surface area, in particular in the case of a low overall height of the front-end space, while continuing to use the cooling air fan driven by the internal combustion engine, the cooler is divided into a plurality of individual component parts which are arranged staggered relative to one another in such a way that they overlap with spacing relative to one another in the driving direction of the motor vehicle and that they are acted upon in common by the cooling-air fan.

20 Claims, 1 Drawing Sheet

COOLING-AIR DUCTING SYSTEM IN THE FRONT-END SPACE OF A MOTOR VEHICLE

BACKGROUND AND SUMMARY OF THE INVENTION

The invention relates to a cooling-air ducting system in the front-end space of a motor vehicle, which front-end space is delimited towards the front by a front-end wall having an air inlet opening for cooling air and in which front-end space is arranged at least one cooler through which cooling air flows, said front-end space having a cooling-air ducting space between the front-end wall and the cooler delimited by partition walls.

A cooling-air ducting system of this general kind is known from German Patent 3,338,466. In this known cooling-air ducting system, a plurality of coolers having different functions are arranged at various heights, at different depths and in different oblique positions in the front-end space of the motor vehicle. A separate air-ducting housing is provided for each cooler, conduction of the cooling air by a common fan not being possible.

An object on which the invention is based is to create a cooling-air ducting system in which, on the one hand, a sufficient cooler size can be achieved even in the case of very restricted space conditions in the front-end space and in which, on the other hand, the cooling air is conveyed in customary fashion by a cooling-air fan.

The object is achieved according to the invention in a cooling-air ducting system of the type mentioned above by providing a system wherein the cooler is divided into a plurality of individual cooler component parts which are arranged staggered relative to one another in such a way that they partially overlap with spacing relative to one another in the driving direction of the motor vehicle, wherein the space formed by the overlapped height and the spacing between the component parts serves for the removal of cooling air from the forward cooler component part and a separate feeding of cooling air to the rearward component part, a partition wall lying obliquely to the principal extension of each cooler component parts.

By virtue of the division of the cooler into a plurality of cooler component parts and their staggered arrangement, in the cooling-air ducting system designed according to the invention a cooler with a sufficient cross-sectional area can be accommodated even in a very shallow front-end space without these component parts screening each other off. In addition, a single cooling-air fan is sufficient for conducting cooling air through all the component parts.

U.S. Pat. No. 1,818,144 discloses the arrangement of a cooler in a space above the cab of a motor vehicle, said cooler comprising a plurality of mutually offset component parts. These overlap each other only with their housings. Partition walls serving to separate air feed and air removal extend perpendicular to the principal extension of the component parts with the result that no gain in cooling area is obtained by this arrangement.

In especially preferred embodiments, an arrangement is provided wherein an upper cooler component part is arranged above supporting structure of a bumper arranged in the front-end wall and is acted upon essentially by cooling air flowing in through the front-end wall above the bumper, and wherein a lower cooler component part is arranged behind the supporting structure and is acted upon essentially by cooling air flowing in through the front-end wall below the bumper. This design guarantees a good division between the different component parts of the cooler of the cooling air flowing in through the front-end wall.

Especially preferred embodiments include an arrangement wherein an upper cooler component part with its lower side lying in front of a lower cooler component part is inclined obliquely upwards and rearwards in such a way that it lies approximately parallel to that part of the front-end wall which lies at the same level. With such an arrangement, the space immediately behind the front-end wall is used in a particularly advantageous manner, it being possible to keep the spacing between the front-end wall and the upper component part of the cooler small over the entire cross-section of the latter. This spacing can be further reduced by providing an arrangement wherein the upper cooler component part is of curved design with essentially uniform spacing relative to the front-end wall as viewed in plan view. Thus, further free space can thereby be obtained downstream of this component part. Despite an oblique alignment of the component parts to the principal direction of flow of the cooling air, deflection of this cooling air caused thereby, and thus an increase in the flow resistance, are avoided in arrangements of the invention wherein coolant pipes and cooling fins of the cooler are aligned in the principal direction of flow of the cooling air irrespective of the alignment or curvature of its cooler component parts.

A favorable arrangement and position of the condensor for the air-conditioning system are provided according to an arrangement of preferred embodiments of the invention wherein an upstream part of a condenser of an air-conditioning system is arranged downstream of the upper cooler component part and a downstream part of the condenser is arranged in the cooling-air ducting space in front of the lower cooler component part. This arrangement ensures a sufficient supply of cooling air to this condenser without significantly impairing the cooling of the component parts of the cooler.

Preferred embodiments of this arrangement includes and arrangement wherein the cooler is designed as a radiator for an internal combustion engine of the motor vehicle and wherein further coolers, such as oil or charge-air coolers are arranged in staggered fashion in the front-end space, having a common cooling-air ducting space with the cooler component cooler. This arrangement creates the possibility of accommodating further coolers in the front-end space with a low space requirement and without serious mutual impairment of the flow of cooling air.

Preferred embodiments also include an arrangement wherein an intake duct for combustion air of an internal combustion engine is passed through a partition wall connecting the lower side of the upper component part to the upper side of the lower component part. With this design, a form of combustion-air ducting has been found which avoids a reduction in the effective cross-section of the cooler, in particular in the width.

Other objects, advantages and novel features of the present invention will become apparent from the following detailed description of the invention when considered in conjunction with the accompanying drawings.

DETAILED DESCRIPTION OF THE DRAWINGS

Figure 1:
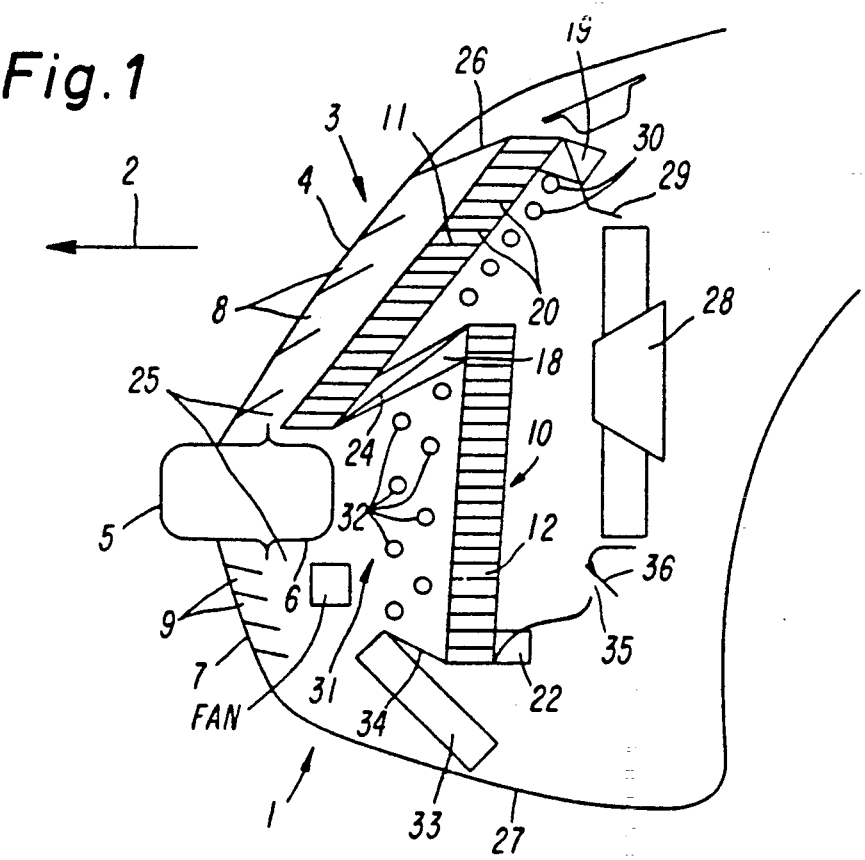
FIG. 1 shows a front-end space of a motor vehicle in longitudinal section, with coolers arranged therein, constructed in accordance with a preferred embodiment of the invention.

The front-end space 1 of a vehicle not shown in greater detail, which is driven by an internal combustion engine (not shown) arranged behind the front-end space 1, is bounded towards the front by a front-end wall 3 in the driving direction 2. The front-end wall 3 essentially comprises a radiator grille 4, a bumper 5, arranged below the latter and having a supporting structure 6 supporting it, and a skirt 7, in turn arranged below the latter. Air inlet openings 8 and 9 are provided in the radiator grille 4 and the skirt 7 for feeding cooling air into the front-end space 1.

Figure 2:
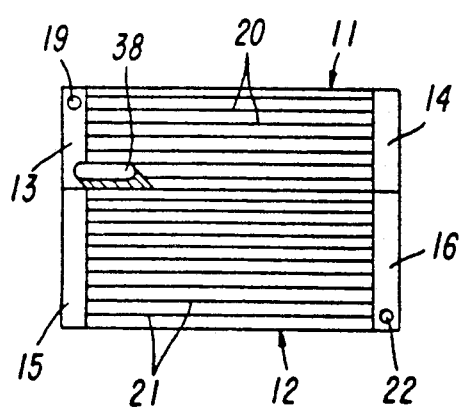
FIG. 2 shows a cooler designed in two component parts, viewed from the rear, with an intake duct for the combustion air of an internal combustion engine driving the motor vehicle, for use in the FIG. 1 arrangement.

Arranged in the front-end space 1 is a cooler or radiator 10 for cooling the internal combustion engine, said radiator comprising an upper component part 11 and a lower component part 12. The two component parts 11 and 12 each have two radiator tanks 13 and 14 and 15 and 16, respectively, at the sides (FIG. 2), which are connected to one another in the lower region of the upper component part 11 and in the upper region of the lower component part 12 in each case via a connecting part 17 and 18 in such a way that coolants flow into the upper region of the upper radiator tank 13 via a feed line 19, can flow on from there into the lower radiator tank 15, from these two radiator tanks 13, 15 can flow on via the water pipes 20, 21 of the two component parts 11 and 12 into the radiator tanks 14, 16 and, from these, can flow on into the return line 22 in the lower region of the lower radiator tank 16.

Figure 3:
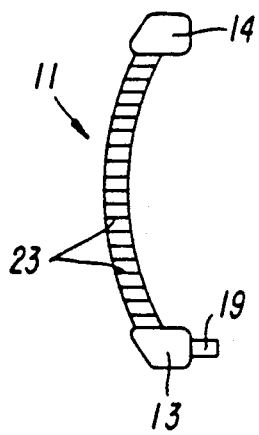
FIG. 3 shows an upper component part of the cooler of FIG. 2 in plan view.

In the upper region, the upper component part 11 is inclined obliquely rearwards, with the result that it lies approximately parallel to the radiator grill 4 with a small clearance. Its lower side lies somewhat above the supporting structure 6 of the bumper 5. Its water pipes 20, which are flattened in cross-section, lie approximately horizontal, with the result that they run approximately parallel to the cooling air acting on them. As can be seen from FIG. 3, the upper component part 11, as seen in plan view, is curved forwards in its central region and thus matched to the corresponding curvature of the radiator grille 4. Its cooling fins 23 are constructed parallel to one another and to the principal direction of flow of the cooling air, with the result that unnecessary deflection of the cooling air downstream of the component part 11 is avoided.

The lower component part 12 of the radiator 10 is arranged approximately vertical and, with its upper side, extends into the central region of the upper component part 11, with horizontal spacing relative to the latter. The space thereby obtained between the two component parts 11, 12 is used to the effect that cooling air passing round the upper, forward component part 11 flows behind the latter in relation to its principal extension and from there flows into the lower, rearward component part 12. A partition wall 24 reaching from the lower side of the upper component part 11 to the upper side of the lower component part 12 and extending at an acute angle to the principal extension (i.e. the main or principal axis) of each component part 11, 12 separates the suction side downstream of the upper component part 11 from the pressure side upstream of the lower component part 12, a short circuit flow of the cooling air thus being avoided. This staggered arrangement of the two component parts 11 and 12 makes repeated use of part of the overall height of the front-end space 1 to accommodate the radiator 10, without the cooling air or part of it being used for cooling in both component parts 11, 12. At the same time, there is a common cooling-air ducting space 25, compensating possible pressure differences, between the front-end wall 3 and the component parts 11, 12, said space furthermore being delimited by an upper partition wall 26 and a lower bodywork wall 27. However, separate air ducting between the front-end wall 3 and the component parts 11, 12 is also possible for each component 11, 12. In addition to the dynamic pressure, the cooling-air is conveyed by a cooling-air fan which acts on both component parts 11, 12 in common, is driven by the internal combustion engine and lies behind the two component parts 11, 12 in a fan shroud 29 encompassing both. An auxiliary fan (shown schematically in FIG. 1), in particular an electrically driven auxiliary fan, can in each case be placed in front of one or both component parts 11, 12.

An upstream part 30 of a condenser 31 for an air-conditioning system having horizontal refrigerant pipes is arranged immediately behind the upper component part 11 of the radiator 10 and a downstream part 32 of the condenser 31 likewise having horizontal refrigerant pipes is arranged immediately in front of the lower component part 12 in the air ducting space 25. In addition to the utilization of a free space, this division and arrangement of the condenser 31 results in the advantages that despite an arrangement of the refrigerant pipes with a large mutual spacing, these represent a large cooling surface, and that the cooling air flowing through the upper component part 11 is not preheated at all in the condenser 31 and the cooling air flowing through the lower component part 12 is only slightly preheated in the condenser 31 because of the already precooled refrigerant flowing into the downstream part 32.

An oil cooler 33, to which cooling air is likewise fed via the cooling-air ducting space 25, is arranged below and obliquely in front of the lower component part 12, directly above the bodywork wall 27. By virtue of this staggered arrangement of the oil cooler 33, the latter can assume an adequate size without the height of the lower component part 12 of the radiator 10 being significantly limited. A further partition wall 34, which prevents a short circuit flow between the cooling-air ducting space 25 and the outflow side of the oil cooler 33, is provided between the oil cooler 33 and the lower component part 12.

Provided in the lower region of the fan shroud 29 is an opening 36 which can be closed by a flap 35 and opens in the case of relatively high speeds of the motor vehicle, which produce a sufficient dynamic pressure in front of the front-end wall 3, and thus, by virtue of a larger outflow cross-section, permits direct outflow of the cooling air flowing through the radiator 10 with the cooling-air fan 28 switched off.

Figure 4:
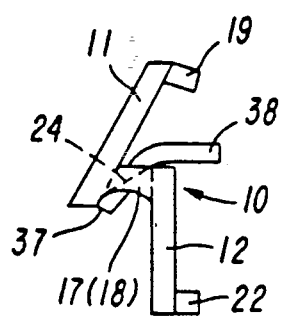
FIG. 4 shows a side view of the cooler of FIG. 2 with the intake duct for the combustion air.

As can be seen from FIG. 4 an opening 37 of an intake duct 38 for the combustion air of the internal combustion engine, which opening is supplied with uncooled air from the cooling-air ducting space 25, is provided on the rear side of the upper component parts 11 of the radiator 10, at the level of its lower side. The intake duct 38 passes through the partition wall 24 in the gap formed by the upper and lower component parts 11, 12, between the connecting parts 17, 18. In this way, it does not require a special space to the side of the radiator 10, without significantly impairing the supply of cooling air to the latter.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Cooling-air ducting system in the front-end space of a motor vehicle, which front-end space is delimited towards the front by a front-end wall having an air inlet opening for cooling air and in which front-end space is arranged a cooling-air fan, at least one cooler through which cooling air flows, having a cooling-air ducting space, delimited by partition walls, between the front-end wall and the cooler, wherein the cooler is divided into an upper cooler component part and a lower cooler component part which are arranged staggered relative to one another in such a way that the upper and lower cooler component parts partially overlap in height and are spaced relative to one another in the driving direction of the motor vehicle, wherein a space formed by the partial overlapping in height and the spacing between the upper and lower cooler component parts serves for the removal of cooling air from the upper cooler component part and a separate feeding of cooling air to the lower cooler component part, each of said upper cooler component part and said lower cooler component part having a principal extensions, a partition wall lying obliquely to the principal extension of each of the upper and lower cooler component parts and separating a suction side downstream of the upper cooler component part from a pressure side upstream of the lower cooler component part, and that the upper and lower cooler component parts are acted upon in common by the cooling-air fan.

2. Cooling-air ducting system according to claim 1, wherein the upper cooler component part is arranged above a supporting structure of a bumper arranged in the front-end wall and is acted upon essentially by cooling air flowing in through the front-end wall above the bumper, and wherein the lower component part is arranged behind the supporting structure and is acted upon essentially by cooling air flowing in through the front-end wall below the bumper.

3. Cooling-air ducting system according to claim 1, wherein the upper cooler component part with its lower side lying in front of the lower cooler component part is inclined obliquely upwards and rearwards in such a way that it lies approximately parallel to that part of the front-end wall which lies at the same level.

4. Cooling-air ducting system according to claim 2, wherein the upper cooler component part with its lower side lying in front of the lower cooler component part is inclined obliquely upwards and rearwards in such a way that it lies approximately parallel to that part of the front-end wall which lies at the same level.

5. Cooling-air ducting system according to claim 2, wherein the upper cooler component part is of curved design with essentially uniform spacing relative to the front-end wall as viewed in plan view.

6. Cooling-air ducting system according to claim 4, wherein the upper cooler component part is of curved design with essentially uniform spacing relative to the front-end wall as viewed in plan view.

7. Cooling-air ducting system according to claim 1, wherein coolant pipes and cooling fins of the cooler are aligned parallel to the principal direction of flow of the cooling air irrespective of the alignment or curvature of its cooler component parts.

8. Cooling-air ducting system according to claim 2, wherein coolant pipes and cooling fins of the cooler are aligned parallel to the principal direction of flow of the cooling air irrespective of the alignment or curvature of its cooler component parts.

9. Cooling-air ducting system according to claim 4, wherein coolant pipes and cooling fins of the cooler are aligned parallel to the principal direction of flow of the cooling air irrespective of the alignment or curvature of its cooler component parts.

10. Cooling-air ducting system according to claim 2, wherein an upstream part of a condenser of an air-conditioning system is arranged downstream of the upper cooler component part and a downstream part of the condenser is arranged in the cooling-air ducting space in front of the lower cooler component part.

11. Cooling-air ducting system according to claim 4, wherein an upstream part of a condenser of an air-conditioning system is arranged downstream of the upper cooler component part and a downstream part of the condenser is arranged in the cooling-air ducting space in front of the lower cooler component part.

12. Cooling-air ducting system according to claim 1, wherein the cooler is designed as a radiator for an internal combustion engine of the motor vehicle and wherein further coolers are arranged in staggered fashion in the front-end space, having a common cooling-air ducting space with said at least one cooler.

13. Cooling-air ducting system according to claim 4, wherein the cooler is designed as a radiator for an internal combustion engine of the motor vehicle and wherein further coolers are arranged in staggered fashion in the front-end space, having a common cooling-air ducting space with said at least one cooler.

14. Cooling-air ducting system according to claim 7, wherein the cooler is designed as a radiator for an internal combustion engine of the motor vehicle and wherein further coolers are arranged in staggered fashion in the front-end space, having a common cooling-air ducting space with said at least one cooler.

15. Cooling-air ducting system according to claim 10, wherein the cooler is designed as a radiator for an internal combustion engine of the motor vehicle and wherein further coolers are arranged in staggered fashion in the front-end space, having a common cooling-air ducting space with said at least one cooler.

16. Cooling-air ducting system according to claim 2, wherein an intake duct for combustion air of an internal combustion engine is passed through said partition wall connecting the lower side of the upper cooler component part to the upper side of the lower cooler component part.

17. Cooling-air ducting system according to claim 4, wherein an intake duct for combustion air of an internal combustion engine is passed through said partition wall connecting the lower side of the upper cooler component part to the upper side of the lower cooler component part.

18. Cooling-air ducting system according to claim 8, wherein an intake duct for combustion air of an internal combustion engine is passed through said partition wall connecting the lower side of the upper cooler component part to the upper side of the lower cooler component part.

19. Cooling-air ducting system according to claim 10, wherein an intake duct for combustion air of an internal combustion engine is passed through said partition wall connecting the lower side of the upper cooler component part to the upper side of the lower cooler component part.

20. Cooling-air ducting system according claim 1, wherein an electrically driven auxiliary fan is arranged upstream of at least one of the upper or lower cooler component parts.

* * * * *